(12) United States Patent
Liu et al.

(10) Patent No.: US 8,390,906 B2
(45) Date of Patent: Mar. 5, 2013

(54) MEMBRANE-BASED METHODS AND SYSTEM FOR COLOR CHARACTERIZATION

(75) Inventors: Juan Liu, Milpitas, CA (US); Haitham Hindi, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 749 days.

(21) Appl. No.: 12/557,838

(22) Filed: Sep. 11, 2009

(65) Prior Publication Data

US 2011/0063698 A1  Mar. 17, 2011

(51) Int. Cl.
*H04N 1/60* (2006.01)

(52) U.S. Cl. .................. 358/518; 375/240.18; 375/243; 375/245

(58) Field of Classification Search ........... 358/518–535
See application file for complete search history.

(56) References Cited

U.S. PATENT DOCUMENTS

| | | | |
|---|---|---|---|
| 5,305,119 A | 4/1994 | Rolleston et al. | |
| 5,528,386 A | 6/1996 | Rolleston et al. | |
| 5,612,902 A | 3/1997 | Stokes | |
| 5,818,960 A | 10/1998 | Gregory, Jr. et al. | |
| 6,809,837 B1 | 10/2004 | Mestha et al. | |
| 2007/0252861 A1 | 11/2007 | Wu et al. | |
| 2008/0109041 A1* | 5/2008 | de Voir | 607/7 |
| 2008/0239344 A1 | 10/2008 | Wang et al. | |
| 2010/0149568 A1* | 6/2010 | Owens | 358/1.9 |

FOREIGN PATENT DOCUMENTS

EP  1 107 578 A2  6/2001

OTHER PUBLICATIONS

Littlewood D et al., "Maintaining an accurate printer characterization", Color Science and Engineering: Systems, Technologies, Applications: Final Program Proceedings of IS&T and SID; The 12th Color Imaging Conference; Nov. 9-12, 2004, Springfield, VA.: IS&T, US; Scottsdale, AZ, USA, Jan. 1, 2004, pp. 203-210, XP008143618, ISBN: 978-0-89208-254-4.

Balasubramaniano R et al: "Refinement of Printer Transformation Using Weighted Regression", Proceedings of SPIE, The International Society for Optical Engineering SPIE, USA, vol. 2658, Jan. 29, 1996, pp. 334-340, XP008020360, ISSN:0277-786X, DOI: 10.1117/12.236984.

EP Search Report, Dec. 10, 2011.

Gaurav Sharma, Digital Color Imaging Handbook, CRC Press.

Swati Bandyopadhyay, Tapan Paul, Tapasi Roychowdhury and Sivaji Bandyopadhyay, "A New Model of Printer Characterization", IS&T's NIP20: 2004 International Conference on Digital Printing Technologies.

(Continued)

*Primary Examiner* — Benny Q Tieu
*Assistant Examiner* — Marcellus Augustin
(74) *Attorney, Agent, or Firm* — Fay Sharpe LLP

(57) ABSTRACT

Methods and systems are presented for characterizing a printer, display or other color reproduction device in which a forward color transform having a parametric surface forward color transform and a nonparametric residual forward color transform is updated by adapting the parametric surface forward color transform using an input adaptation data set and a measured adaptation data set, generating a prediction data set in the second color space using the adapted parametric surface forward color transform and the nonparametric residual forward color transform, generating a prediction error data set in the second color space using the input adaptation data set and the prediction data set, generating a membrane forward color transform using the prediction error data set, and updating the forward color transform using the adapted parametric and nonparametric forward color transforms.

16 Claims, 7 Drawing Sheets

OTHER PUBLICATIONS

Raja Balasubramanian, The Use of Spectral Regression in Modeling Halftone Color Printers, Journal of Electric Imaging, Apr. 1999, vol. 8(2).

Raja Balasubramanian, "Colorimetric Modeling of Binary Color Printers", pp. 1-4.

Jon Yngve Hardeberg and Francis Schmitt, "Color Printer Characterization Using a Computational Geometry Approach".

Raja Balasubramanian, A Spectral Neugebauer Model for Dot-On-Dot Printers, pp. 1-11.

* cited by examiner

MEMBRANE-BASED METHODS AND SYSTEM FOR COLOR CHARACTERIZATION

BACKGROUND

The present disclosure is generally related to the field of color characterization for color rendering devices such as image/text printing or display systems. Characterization of the underlying mapping (forward transform) from a printer or display's internal color space (e.g., CMY, CMYK, etc.) to a perceived print-out color space (e.g., La*b* or other color spectrum) is important to achieving color consistency within and across color reproduction devices. In practice, this color mapping varies from device to device, and varies over time in a single device, due to physical conditions such as temperature, humidity, inks or other marking materials, printed media type (e.g., paper stock type, thickness), component wear and tear, and manufacturing tolerances associated with the reproduction devices. The characterization of the forward color mapping facilitates adjustments in the rendering process via control algorithms to adjust individual devices in order to achieve color consistency across product lines and over time.

BRIEF DESCRIPTION

Methods and systems are provided for characterizing a transform of a color reproduction device in which a forward color transform having a smooth parametric surface forward color transform and a fine-level nonparametric residual forward color transform is updated by adapting the parametric transform using an input adaptation data set and a measured adaptation data set, and the nonparametric residual forward color transform is adapted using the input adaptation data set. In color reproduction devices, the smooth surface drifts over time as the printing or display conditions change, whereas the residual device performance characterized by the nonparametric transform remains generally static. The parametric surface transform, however, is global across the gamut of the device and therefore may lack the capability to accurately describe local variations, particularly for low-order (efficient) polynomial formulations. Consequently, if different parts of the color gamut drift in different ways, the surface polynomial becomes less accurate. The present disclosure advantageously adapts the transform by construction of a continuous and locally smooth surface, referred to as a membrane surface, which drifts in a globally heterogeneous but locally homogeneous fashion to accurately characterize the color transformation of a device without requiring multiple densely sampled color patch sets to be created over time to address the time evolution pattern of the device while allowing use of a polynomial or other computationally efficient parametric surface transform.

A color processing device is provided, which includes a rendering system for producing visible images according to input color data in a first color space (e.g., CMY or CMYK data), a system controller providing the input color data to the rendering system, a sensor for generating measured data in a second color space (e.g., La*b* data) representative of the visible image, and a characterization system coupled with the system controller and the sensor. The characterization system includes a forward color transform including a parametric surface forward color transform and a nonparametric residual forward color transform for the color processing device. The characterization system is operative to adapt the parametric surface forward color transform using an input adaptation data set in the first space and a measured device adaptation data set in the second space, to generate a prediction data set in the second color space using the adapted parametric surface forward color transform and the nonparametric residual forward color transform, to generate a prediction error data set in the second color space using the input adaptation data set and the prediction data set, to generate a membrane forward color transform using the prediction error data set, and to update the forward color transform using the adapted parametric and nonparametric forward color transforms.

The generation of the prediction data set in one embodiment is accomplished in the characterization system through evaluating the parametric surface forward color transform and evaluating the nonparametric residual forward color transform for each point in the input adaptation data set, and summing the surface and residual transform evaluations. The characterization system in certain embodiments generates the prediction error data set by subtracting the values of the prediction data set from the values of the measured adaptation data set, and generates the smooth membrane forward color transform by fitting a continuous and piecewise smooth surface to the prediction error data set.

A method is provided for characterizing a color reproduction device. The method includes providing a forward color transform for the device including a parametric surface forward color transform and a nonparametric residual forward color transform, producing a plurality of visible adaptation test images according to an input adaptation data set in a first color space using the device, and measuring the adaptation test images to generate a measured adaptation data set in a second color space. The method further includes adapting the parametric surface forward color transform using the input adaptation data set and the measured adaptation data set, generating a prediction data set in the second color space using the adapted parametric surface forward color transform and the nonparametric residual forward color transform, generating a prediction error data set in the second space using the input adaptation data set and the prediction data set, and generating a membrane forward color transform using the prediction error data set, and adapting the nonparametric residual forward color transform using the input adaptation data set, and updating the forward color transform using the adapted parametric and nonparametric forward color transforms.

In certain embodiments, generating the prediction data set includes evaluating the parametric surface forward color transform for each point in the input adaptation data set, evaluating the residual forward color transform for each point in the input adaptation data set, and summing the surface and residual transform evaluations for each point in the input adaptation data set to generate the prediction data set. Generation of the prediction error data set in some embodiments involves subtracting the values of the prediction data set from the values of the measured adaptation data set, and generating the membrane forward color transform includes fitting a membrane polynomial surface to the prediction error data set. The updating of the forward color transform in certain embodiments includes summing the parametric surface forward color transform with the nonparametric residual forward color transform and the membrane forward color transform.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
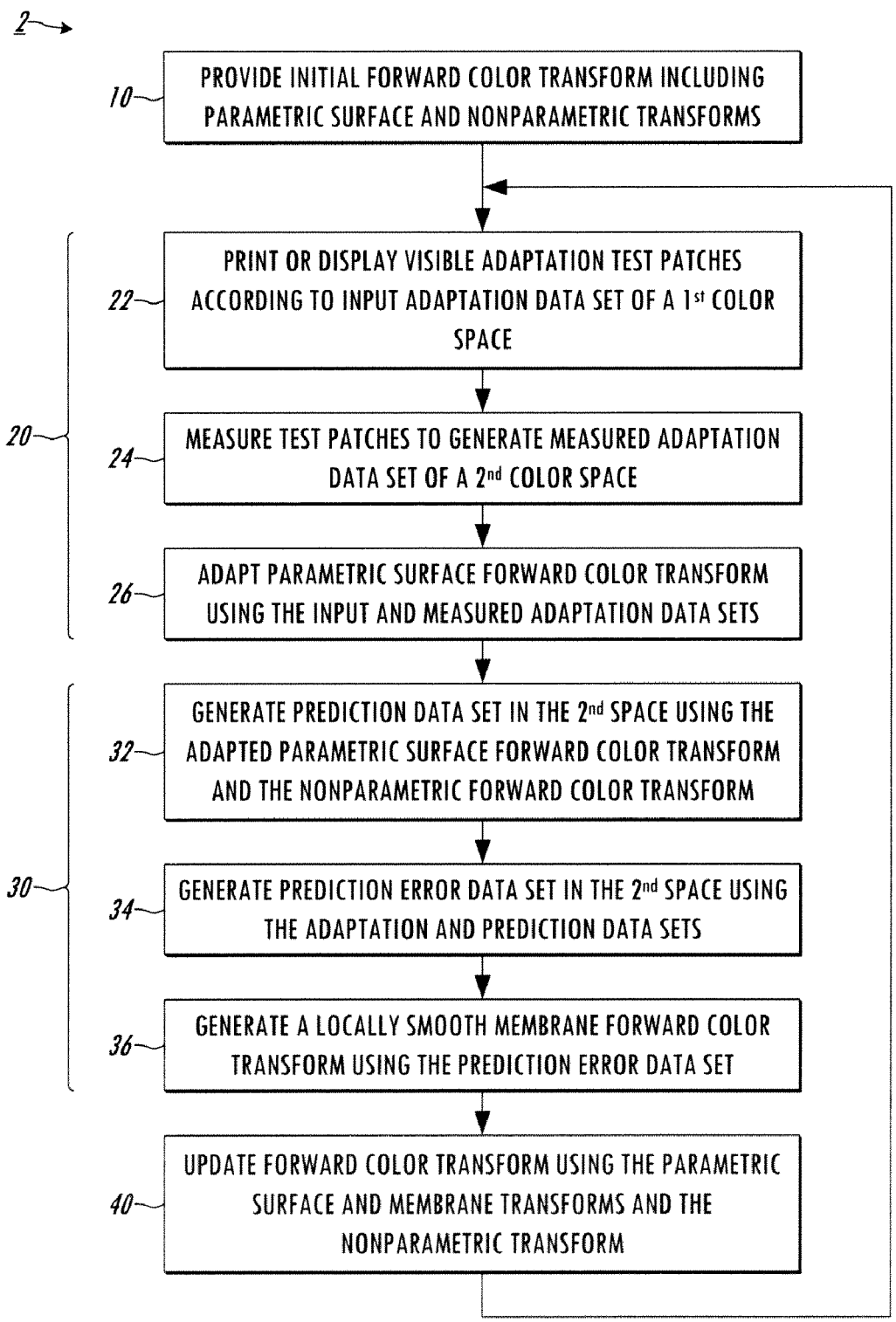
FIG. 1 is flow diagram illustrating an exemplary method for characterizing a color reproduction device in accordance with the present disclosure.

Referring now to the drawings, the disclosed techniques characterization methods and systems provide for adaptation of a forward color transform separated into a smooth surface parametric transform that tends to drift over time and a generally static nonparametric residual transform. Decomposition of the device forward transform into parametric and nonparametric components facilitates achieving estimation accuracy comparable to conventional data-fitting techniques, together with computational efficiency and a significantly smaller number of data samples in the color space for adaptation. In addition, the technique yields robustness to noise and varying printing conditions. The inventors have further appreciated that the parametric representation of the smooth surface facilitates efficient computation in operation, but may be unable to accurately characterize local variation. To address these issues, the described membrane adaptation of the forward transform characterization can be employed to mitigate or overcome this deficiency by constructing a smooth membrane which drifts in a globally heterogeneous but locally homogeneous fashion. Thus, the embodiments may be implemented in association with printing systems, color displays, and other color reproduction devices to provide computationally efficient modeling of the device color transform properties while properly characterizing localized variations as the device performance drifts over time at different locations of the device color gamut. The device characterization systems and methods of the disclosure are illustrated and described below in the context of exemplary printing systems having marking stations for application of marking material (e.g., ink, toner, etc.) to printable media, as well as display devices that render visible images on a display screen, although the characterization concepts of the present disclosure may be applied in association with any type of color reproduction device capable of producing visible images.

Figure 2:
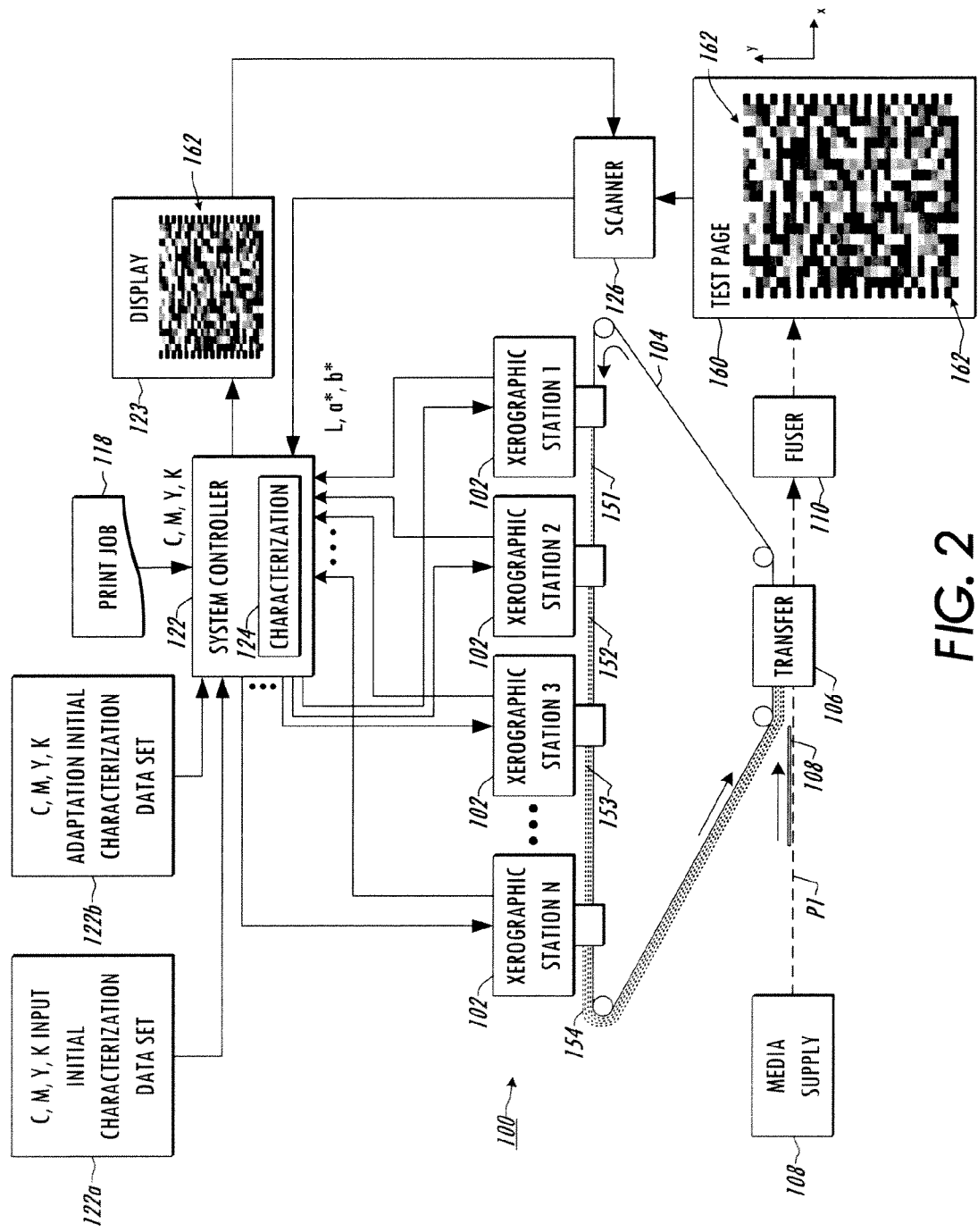
FIG. 2 is a simplified schematic system level diagram illustrating an exemplary multi-color document processing system in accordance with several aspects of the disclosure.
Figure 3:
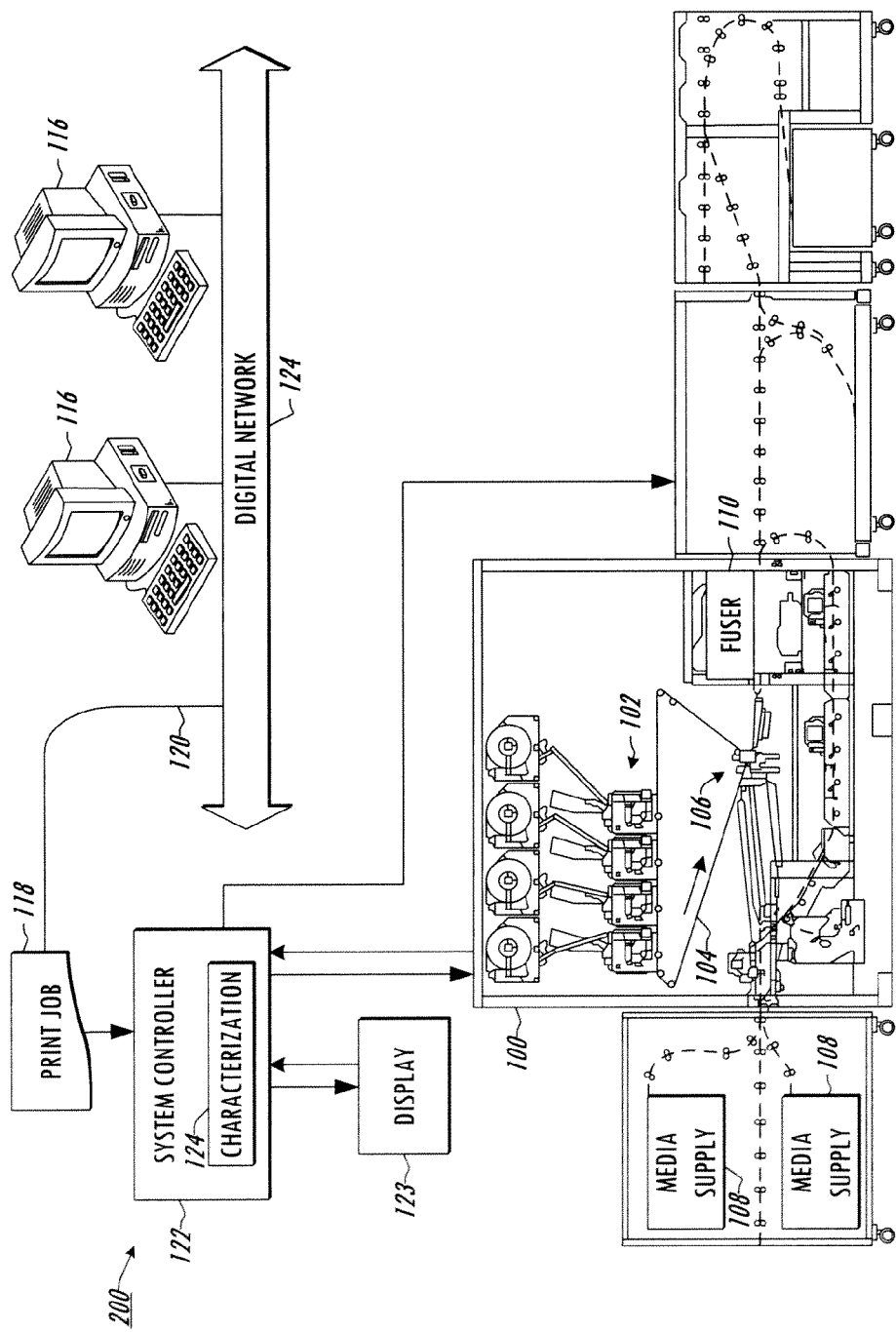
FIG. 3 is a detailed side elevation view illustrating an exemplary embodiment of the system of FIG. 2 in accordance with the present disclosure.
Figure 4:
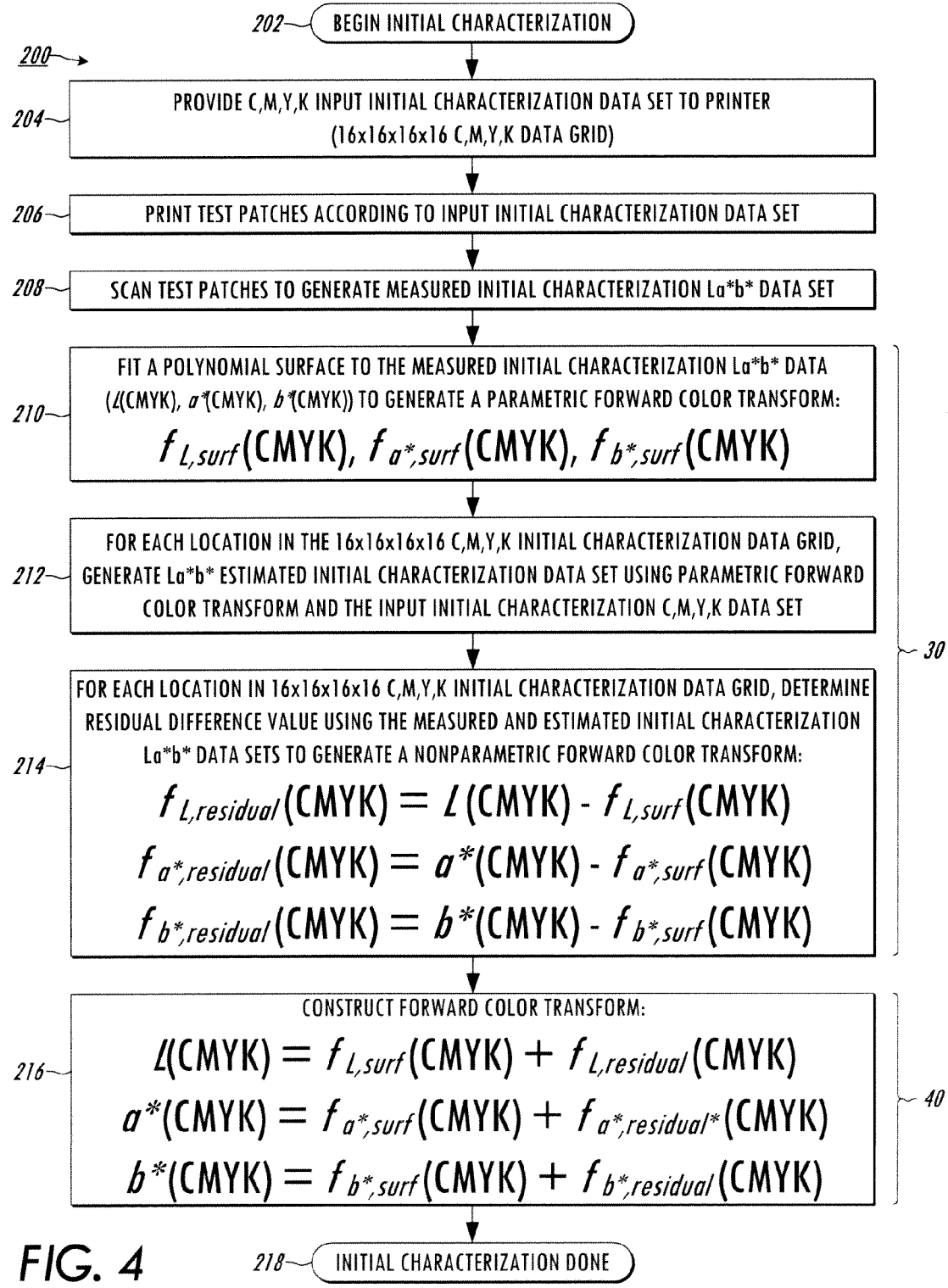
FIG. 4 is a flow diagram illustrating a color printer device characterization embodiment of the present disclosure.
Figure 5A:
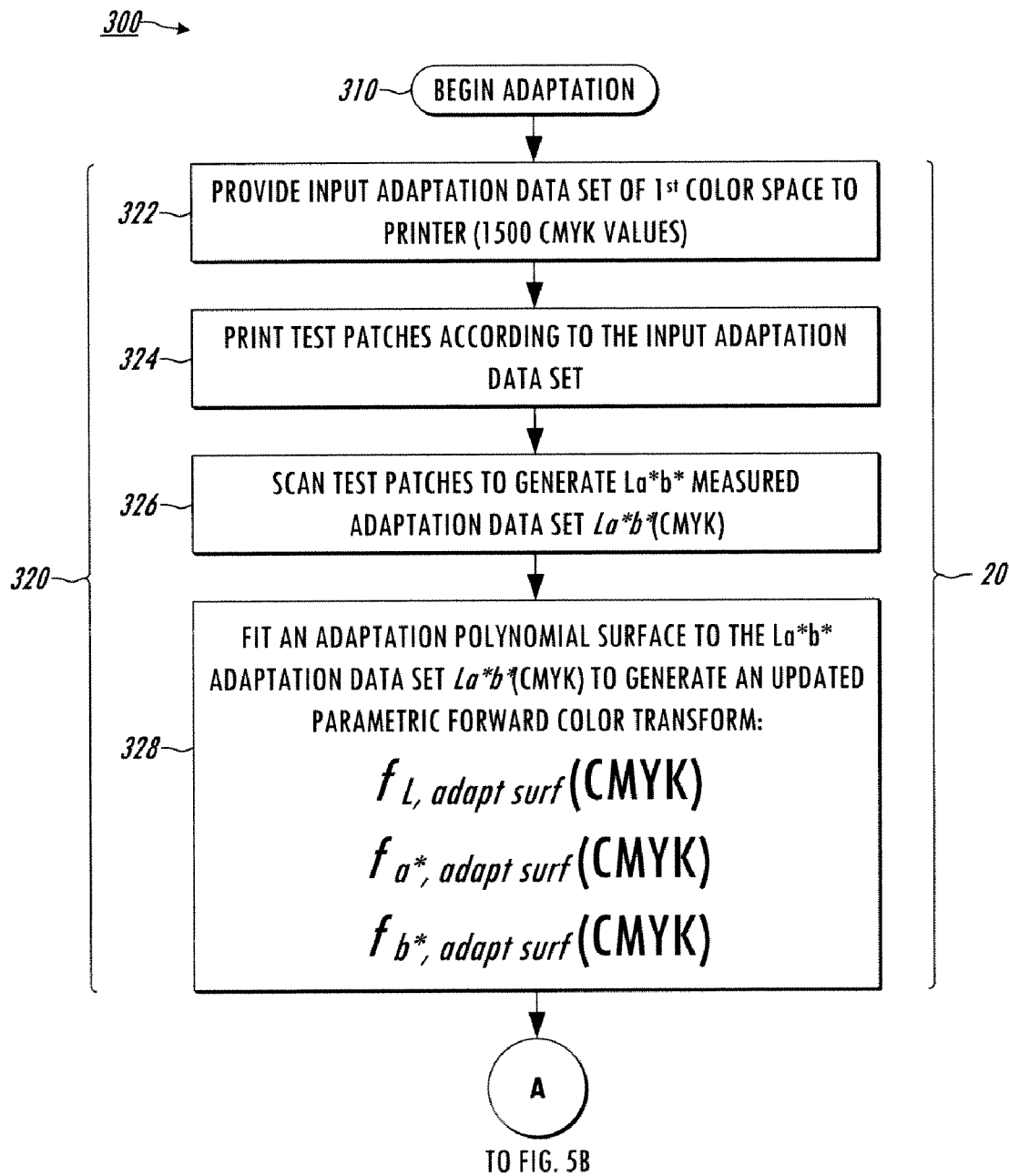
FIGS. 5A and 5B depict a flow diagram illustrating an exemplary color printer characterization adaptation embodiment of the present disclosure.
Figure 5B:
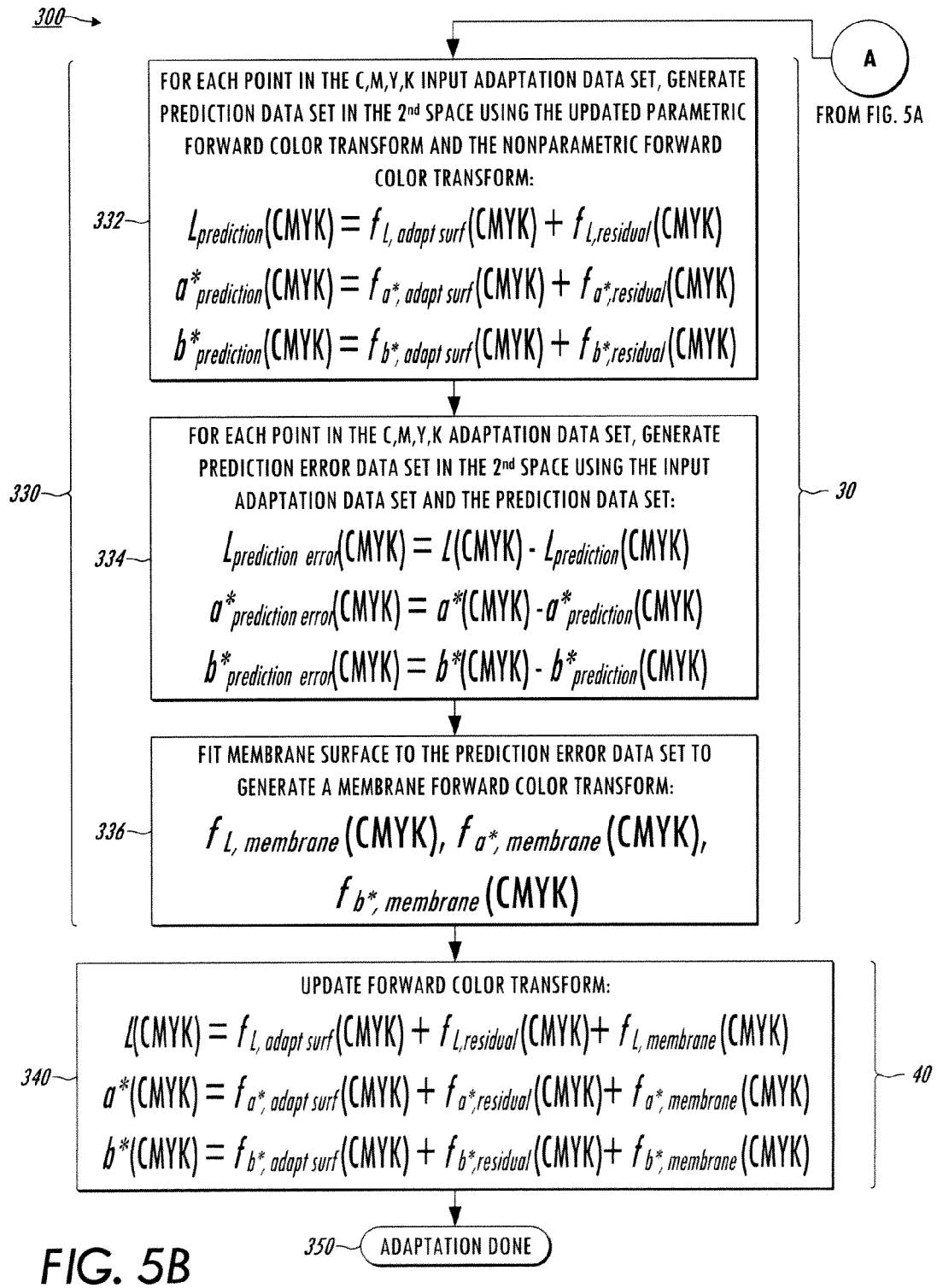
Figure 6:
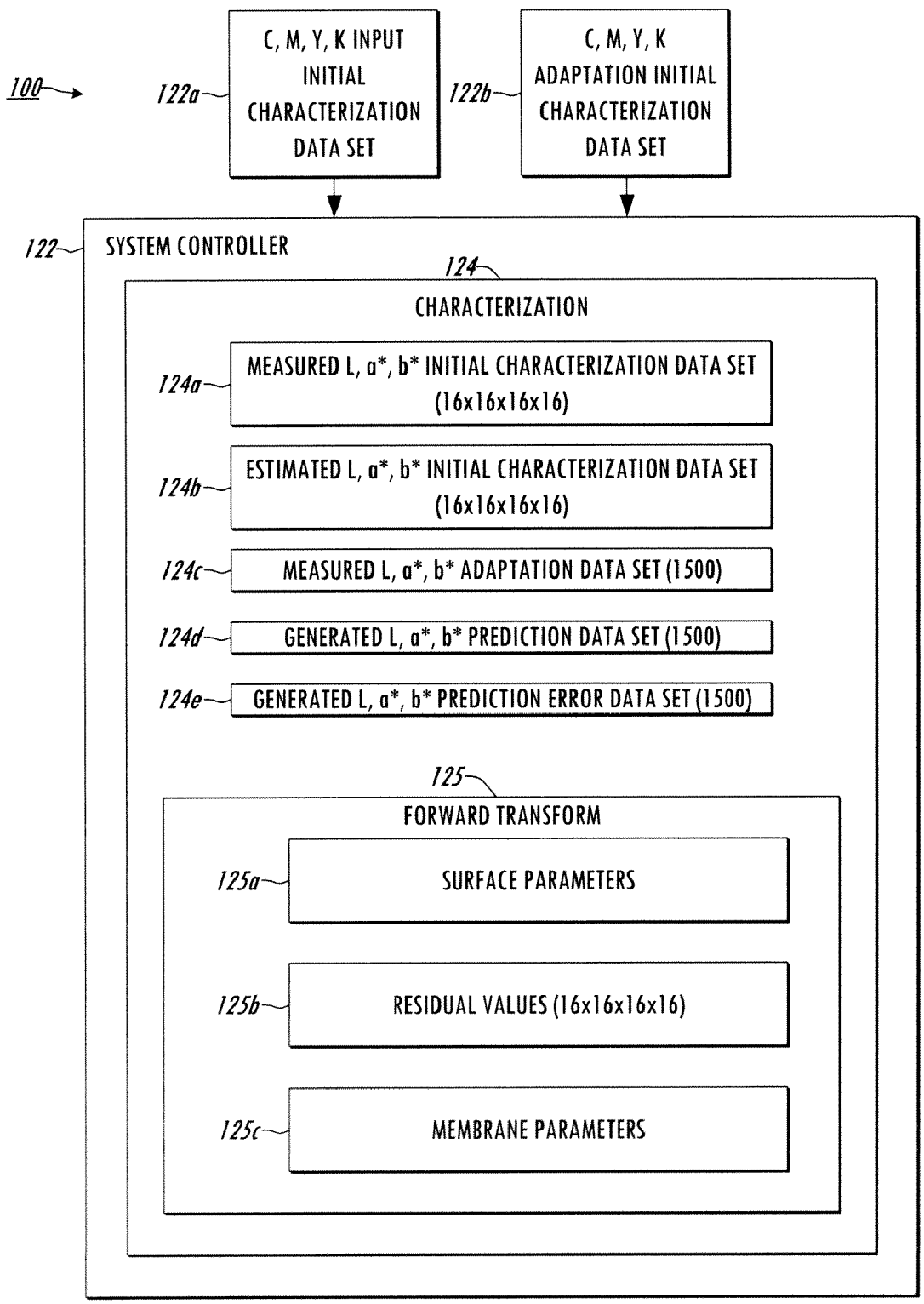
FIG. 6 is a schematic diagram illustrating further details of the characterization system in the embodiments of FIGS. 2 and 3.

Referring initially to FIGS. 1-3 and 6, an exemplary method 2 is illustrated in FIG. 1 for characterizing a color reproduction device, and FIGS. 2, 3, and 6 depict exemplary printing systems or devices 100 with system controllers 122 and characterization systems 124 in which the method 2 may be implemented. While the exemplary method 2 of FIG. 1 and the processes 200, 300 in FIGS. 4-5B are illustrated and described below in the form of a series of acts or events, the various methods of the disclosure are not limited to the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods 2, 200, 300 and other methods of the disclosure may be implemented in hardware, processor executed software, or combinations thereof, whether in a single characterization system or in distributed form in two or more components or systems, in order to characterize a color printing device, color display or other color reproduction device, and may be employed in any form of printing system including without limitation desktop printers, computers, network printers, stand-alone copiers, multi-function printer/copier/facsimile devices, high-speed printing/publishing systems and digital printing presses, digital cameras, etc. wherein the disclosure is not limited to the specific applications and implementations illustrated and described herein.

The method 2 begins at 10 in FIG. 1, where a forward color transform is provided for the device 100 (e.g., transform 125 in FIG. 6) that maps color from a first color space to a second color space. The transform includes a parametric surface forward color transform (125a) and a nonparametric residual forward color transform (125b). The initial forward surface and residual transforms 125a and 125b can be provided by any suitable techniques at 10. In one example, a plurality of visible test images 162 are produced (e.g., test patches 162 printed onto test page(s) 160 or rendered on a display 123 in FIG. 2) according to an input initial characterization data set of a first color space (e.g., device dependent C,M,Y,K data 122a representing given amounts of Cyan, Magenta, Yellow, and black (K) in FIG. 6) using a color reproduction device 100, 123 (FIGS. 2 and 3). The test images 162 in this example are then measured (e.g., using a scanner 126 in FIGS. 2 and 3) to generate a measured initial characterization data set in a second color space (e.g., L, a*, and b* data values 124a in FIG. 6 in a CIE (Commission Internationale de L'eclairage) device independent color space). A parametric forward color transform 125a is generated using the input initial characterization data set 122a and the measured initial characterization data set 124a, such as by fitting a second or third-order polynomial surface to the data to yield a number of polynomial parameters or coefficients 125a (FIG. 6) that are stored in the characterization system 125. Values of the input initial characterization data set 122a are then evaluated using the parametric forward color transform 125a to generate an estimated initial characterization data set 124b. A nonparametric forward color transform 125b (FIG. 6) is then generated, for instance, by subtracting the estimated data set values 124b from the measured initial characterization data set values 122a to determine residual difference values. In one embodiment, the forward color transform 125 for the device 100 is then provided at 10 as a summation of the parametric and nonparametric forward color transforms 125a, 125b.

At 20 in FIG. 1, the nonparametric forward color transform 125a is adapted. In the illustrated embodiment, a plurality of visible adaptation test images 162 are produced at 22 (e.g., printed or displayed patches 162) according to an input adaptation data set 122b in the first color space using the device 100. The visual adaptation test images 162 are then measured at 24 (e.g., via scanner 126) to generate a measured adaptation data set 124c in the second color space (FIG. 6), and the parametric forward color transform 125a is adapted or modified at 26 using the input adaptation data set 122b and the measured adaptation data set 124c, such as by fitting an adaptation polynomial surface to the adaptation data. In a preferred implementation, the scanner 126 or other measurement means is an in-line apparatus integrated into the device being characterized and the adaptation processes 20 and 30 may be automated to run without user intervention.

At 30 in FIG. 1, a smooth membrane 125c is constructed, and the forward color transform 125 is then updated at 40 using the adapted parametric and nonparametric forward color transforms 125a, 125b. In the illustrated example, the membrane construction at 30 includes generating a prediction data set 124d in the second color space at 32 using the adapted parametric surface forward color transform 125a and the nonparametric residual forward color transform 125b. In one embodiment, the prediction data set 124d is generated at 32 by evaluating the parametric surface forward color transform 125a for each point in the input adaptation data set 122b, evaluating the nonparametric residual forward color transform 125b for each point in the input adaptation data set 122b, and summing the parametric and nonparametric transform evaluations for each point in the input adaptation data set 122b to generate the prediction data set 124d.

At 34, a prediction error data set 124e in the second color space is generated using the input adaptation data set 122b and the prediction data set 124d. In one example, this is accomplished by subtracting the values of the prediction data set 124d from the values of the measured adaptation data set 124c for each point in the input adaptation data set 122b. A membrane forward color transform 125c is generated at 36 using the prediction error data set 124e, such as by fitting a continuous and locally smooth membrane surface to the prediction error data set 124e in one embodiment. The forward color transform 125 is then updated at 40, for example, by summing the parametric surface forward color transform 125a with the nonparametric residual forward color transform 125b and the membrane forward color transform 125c.

Referring now to FIGS. 2, 3, and 6, the exemplary color processing device 100 includes a rendering system with xerographic stations 102 and a display 123, either or both of which operate to produce visible images according to input color data. The device 100 further includes a system controller 122 which provides input (e.g., C,M,Y,K) color data to the rendering system 102, 123 according to a print job 118, as well as a scanner type sensor 126 that generates measured (e.g., L,a*,b*) data 124a, 124c representative of the perceivable spectral content of printed or displayed visible images 162. The scanner 126 in certain embodiments may be integrated into the rendering system for in-line scanning of printed images 162 on test pages 160. FIG. 2 illustrates an exemplary tandem multi-color document processing system 100, where the marking devices 102 are individually operable according to control signals or data from the controller 122 to transfer toner marking material 151-153 onto an intermediate substrate 104 that may or may not be a photoreceptor, in this case, a shared intermediate transfer belt (ITB) 104 traveling in a counter clockwise direction in the figure past the xerographic marking devices 102, also referred to as marking engines, marking elements, marking stations, etc. In other embodiments, a cylindrical drum may be employed as an intermediate transfer substrate, with the marking devices 102 positioned around the periphery of the drum to selectively transfer marking material thereto.

FIG. 3 depicts a system 100 having four marking devices 102 configured along a shared or common intermediate transfer belt 104. This figure shows an exemplary printing environment or system 200 including an embodiment of the above-described document processing system 100 having marking stations 102 along with a transfer station 106, a supply of final print media 108, and a fuser 110 as described in FIG. 2 above. In normal operation, print jobs 118 are received at the controller 122 via an internal source such as an in-line or outboard scanner 126 (FIG. 2) and/or from an external source, such as one or more computers 116 connected to the system 100 via one or more networks 124 and associated cabling 120, or from wireless sources. The print job execution may include printing selected text, line graphics, images, magnetic ink character recognition (MICR) notation, etc., on the front and/or back sides or pages of one or more sheets of paper or other printable media. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 200 may be a stand-alone printer or a cluster of networked or otherwise logically interconnected printers, with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

As shown in FIGS. 2, 3, and 6, a characterization system 124 is operatively coupled with (and may be implemented integrally to) the system controller 122. In one exemplary embodiment, the characterization system 124 is implemented as a processor-based system having suitable processing and memory components programmed or configured to implement the characterization process 2 and other functionality as described herein. The characterization system 124 includes the forward color transform 125 for the device 100 including the parametric surface forward color transform 125a, the nonparametric residual forward color transform 125b, and the membrane transform 125c (FIG. 6).

In operation, the characterization system 124 adapts the parametric surface forward color transform 125a using the input adaptation data set 122b and the measured adaptation data set 124c. The characterization system 124 also generates the prediction data set 124d using the adapted parametric surface forward color transform 125a and the nonparametric residual forward color transform 125b. In one implementation, the characterization system 124 evaluates the parametric surface forward color transform 125a for each point in the input adaptation data set 122b, evaluates the nonparametric residual forward color transform 125b for each point in the input adaptation data set 122b, and sums the parametric and nonparametric transform evaluations for each point in the input adaptation data set 122b in order to generate the prediction data set 124d.

The characterization system 124 in the illustrated embodiment generates a prediction error data set 124e using the input adaptation data set 122b and the prediction data set 124d. In one example, this is done by subtracting the values of the prediction data set 124d from the values of the measured adaptation data set 124c for each point in the input adaptation data set 122b. The characterization system 124 then generates the membrane forward color transform 125c using the prediction error data set 124e to adapt the nonparametric residual forward color transform 125b, such as by fitting a membrane surface to the prediction error data set 124e in one embodiment. The system 124 then updates the forward color transform 125 using the adapted parametric and nonparametric forward color transforms 125a, 125b, for example, as a summation of the parametric surface forward color transform 125a with the nonparametric residual forward color transform 125b and the membrane forward color transform 125c.

FIGS. 4-5B provide a detailed implementation of a characterization process 200 and a corresponding adaptation process 300 in the context of color printer characterization in the system 100. The color reproduction performance of the system 100 is characterized as a mapping from the four-dimensional first color space (C,M,Y,K) color representation of the input data to a three-dimensional L,a*,b* representation in independent second (CIE) color space, and thus involves formation of three functions, one for each of the second color space values, i.e., the estimated color (L, a*, b*)=($f_L$(C,M, Y,K), $f_{a*}$(C,M, Y,K), $f_{b*}$(C,M, Y,K). The system controller 122 in certain embodiments is configured to use this forward transformation to derive an inverse transform by which the input data from print jobs 118 can be modified such that the output images (printed or displayed) are consistent when viewed by users across different printers and over time.

The decomposition of the forward transform 125 into two elements (parametric 125a and nonparametric 125b in FIG. 6) advantageously facilitates scalability so that the transform does not require a huge number of training samples as well as computational efficiency allowing quick calibration and easy adaptation, robustness against noise and robustness against printing condition variations. In addition, this transform decomposition splits the overall mapping ($f_L$, $f_{a*}$, or $f_{b*}$) into low-frequency and high-frequency components, where the low-frequency part is a smooth surface which can be modeled using a parametric function by parametric estimation or other data-fitting techniques. The high-frequency component is modeled using a more flexible nonparametric representation. With respect to printing systems generally, the inventors have appreciated that the two components of the transform represent different aspects and exhibit different time-evolution patterns. The smooth surface represented by the parametric transform 125a is related to the internal operating conditions of the color reproduction device, such as temperature, toner mass-charge ratio, and other physical characteristics that vary over time. Consequently, the modeled smooth surface $f_{surf}$ (transform 125a) drifts slowly, and is therefore advantageously adapted over time in certain embodiments of the characterization system 124. The fine-level details of the nonparametric transform $f_{residual}$ (transform 125b), on the other hand, are largely a function of printer design and external factors such as halftone patterns and printing media 108 (e.g., glossy paper vs. flat paper, heavy-weight vs. regular paper), and thus remain generally static.

The inventors have appreciated that two-part separation allows a computationally efficient adaptation scheme in which $f_{surf}$ 125a and $f_{residual}$ 125b are adapted separately or differently over time. In this regard, the residual transform $f_{residual}$ 125b is initially more expensive to construct, but does not require subsequent adaptation per se because it is static, whereas the smooth low-frequency parametric transform $f_{surf}$ 125a drifts over time, and is therefore advantageously adapted from time to time, but the adaptation is quick and low-cost, because the transform $f_{surf}$ 124a is modeled as a polynomial surface with relatively few parameters. This allows frequent update of the surface, e.g., once per day or even per hour, or during startup, etc. The inventors have further recognized that the smooth parametric surface transform 125a may be unable to fully characterize localized variation in the drifting device performance, and that incorporation of the membrane 125c in the forward transform 125 can advantageously augment the parametric transform 125a drift-tracking to accommodate globally heterogeneous and locally homogeneous performance variation over time, without significant impact of the computational efficiency of the transform 125 as a whole.

FIG. 4 depicts and initial device characterization process 200 beginning at 202, in which a C,M,Y,K input initial characterization data set 122a is provided at 204. In one example for an 8-bit C,M,Y,K space, the input initial characterization set 122a is derived from a 16×16×16×16 grid in which each of the C,M,Y,K dimensions is a uniform 16-level grid taking values in the range from 0 to 255. Test patches (e.g., patches 162 on test page(s) 160 in FIG. 2) are then printed at 206 according to the input initial characterization data set 122a. The test patches 162 are then scanned at 208 to generate the measured initial characterization La*b* data set 124a.

Thereafter at 210-216, the characterization system 124 provides an initial color transform 125 that includes both a parametric surface transform 125a and a nonparametric residual transform 125b. The characterization system 124 constructs $f_{surf}$ 125a at 210 from the input initial characterization C,M,Y,K data set 122a and the measured initial characterization La*b* data set 124a, by fitting a $2^{nd}$ or $3^{rd}$ order polynomial surface to the data, although any order of parametric fitting may be employed. In one implementation, fitting a smooth surface to obtain the parametric transform $f_{surf}$ 125a is done via regression. For instance, a $2^{nd}$ order surface over four-dimensional C,M,Y,K space is parameterized by 15 parameters 125a, and a $3^{rd}$ order surface implementation includes 45 parameters 125a. With the estimated parameters 125a ($f_{surf}$(C,M,Y,K) specified), the system 124 can evaluate the estimated surface value for any given CMYK input. The parametric forward color transform 125a in this example is $f_{L,surf}$(CMYK); $f_{a*,surf}$(CMYK); and $f_{b*,surf}$(CMYK). At 212, the characterization system 124 generates estimated La*b* data values for each location in the 16×16×16×16 grid of the C,M,Y,K space by evaluating the parametric forward color transform 125a for each data value of the input initial characterization C,M,Y,K data set 122a to generate the estimated set 124b (FIG. 6).

At 214, the system 124 computes the difference between the measured and estimated La*b* values to generate the nonparametric forward color transform 125b: $f_{L*,residual}$(CMYK)=L(CMYK)−$f_{L,surf}$(CMYK); $f_{a*,residual}$(CMYK)= a*(CMYK)−$f_{a*,surf}$(CMYK); and $f_{b*,residual}$(CMYK)= b*(CMYK)−$f_{b*,surf}$(CMYK). The nonparametric transform $f_{b*,residual}$ 125b in one embodiment is evaluated via nonparametric interpolation. In this case, for the CMYK values of the 16-level grid set, a residual value is stored. For any CMYK value not on the grid, a distance-averaged interpolation technique is employed in this embodiment to evaluate $f_{residual}$ to find its immediate neighbors in the core set and their corresponding residual La*b* values. Next, the system 124 computes a weighted average of the neighbors' La*b* values according to the following formula:

$$f_{residual}(C, M, Y, K) = \sum_{i \in N} \alpha_i f_{residual}(i),$$

where N is the neighborhood in the core set CMYK space, and $f_{residual}(i)$ is the residual value of the neighboring point that can be looked up from the core set. Each neighbor i is weighted by a weight αi, set to be proportional to the inverse distance to the neighbors in the CMYK space. In this manner, a neighbor point closer in the CMYK space is given a heavier weight than the neighbors further away. The weighted average is then taken to be the predicted value of the La*b* residual. This grid-based residual representation 125b is then stored in the system 124 and remains static.

At 216 in FIG. 4, the characterization system 124 constructs the initial forward transform 125 as the summation of the functions for each transform 125a, 125b for each of the second color space dimensions L,a*,b*: L(CMYK)=$f_{L,surf}$(CMYK)+$f_{L,residual}$(CMYK); a*(CMYK)=$f_{a^*,surf}$(CMYK)+$f_{a^*,residual^*}$(CMYK); and b*(CMYK)=$f_{b^*,surf}$(CMYK)+$f_{b^*,residual}$(CMYK), thereby completing the initial device characterization at 218. It is noted that an onboard characterization system 124 may perform some or all of the initial characterization tasks as described above, or some or all these tasks may be performed by an external system.

FIGS. 5A and 5B illustrate an exemplary adaptation process 300 in the characterization system 124, beginning at 310, wherein the nonparametric residual forward color transform 125b is adapted at 320 using the input adaptation data set 122b. In practice, the adaptation processing can be performed on each individual device 100 once every day during cycle-up time, or customer printing jobs to obtain the measured adaptation set 124c, preferably via an onboard characterization system 124 without requiring user intervention. At 322, the system 124 is provided with a C,M,Y,K input adaption data set 122b for updating/adapting the parametric transform 125a ($f_{L,surf}$, $f_{a^*,surf}$, $f_{b^*,surf}$) for each individual color reproduction device 100. At 324, the input adaptation data set 122b is used to print test patches (e.g., patch images 162 in FIG. 2), and these are scanned at 326 (using scanner 126) to generate a measured La*b* adaptation data set 124c (FIG. 6). The C,M,Y,K input adaptation data set 122b and the corresponding measured La*b* adaptation data set 124c (e.g., around 1500 values for each in one embodiment) are then fitted at 328 to generate an updated parametric forward color transform $f_{La^*b^*, adapt\ surf}$(CMYK) 125a=($f_{L, adapt\ surf}$(CMYK); $f_{a^*, adapt\ surf}$(CMYK); and $f_{b^*, adapt\ surf}$(CMYK).

As shown in FIG. 5B, the characterization system 124 then constructs a smooth membrane transform 125c at 330 using the input adaptation data set 122b before updating the forward color transform 125 at 340 using the adapted parametric and nonparametric forward color transforms. At 332 in FIG. 5B, the system 124 generates the prediction data set 124d by evaluating the parametric surface forward color transform 125a for each point in the input adaptation data set 122b, evaluating the nonparametric residual forward color transform 125b, and summing the parametric and nonparametric transform evaluations for each point in the input adaptation data set 122b to generate the prediction data set 124d:

$L_{prediction}(CMYK)=f_{L,adapt\ surf}(CMYK)+f_{L,residual}(CMYK)$, $a^*_{prediction}(CMYK)=f_{a^*,adapt\ surf}(CMYK)f_{a^*,residual}(CMYK)$, and $b^*_{prediction}(CMYK)=f_{b^*,adapt\ surf}(CMYK)+f_{b^*,residual}(CMYK)$.

Thereafter at 334, the characterization system 124 generates a prediction error data set 124e by subtracting the values of the prediction data set 124d from the values of the measured adaptation data set 124c for each point in the input adaptation data set 122b:

$L_{prediction\ error}(CMYK)=L(CMYK)-L_{prediction}(CMYK)$, $a^*_{prediction\ error}(CMYK)=a^*(CMYK)-a^*_{prediction}(CMYK)$, and $b^*_{prediction\ error}(CMYK)=b^*(CMYK)-b^*_{prediction}(CMYK)$.

At 336, the system 124 generates the membrane forward color transform 125c by fitting a continuous and locally smooth membrane surface to the prediction error data set 124e:

$f_{L,membrane}(CMYK)$, $f_{a^*,membrane}(CMYK)$, and $f_{b^*,membrane}(CMYK)$.

The construction of the membrane transform 125c at 336 in FIG. 5B can be done using any suitable techniques, including without limitation, piecewise spline fitting or low-pass filtering. In one exemplary implementation, medium filter fitting is employed at 336, since median filtering is known to be robust against sporadic noise and provides computational efficiency such that the efficiency impact on computation of the overall transform 125 is controlled. The membrane transform 125c is stored as a number of polynomial coefficients or parameters 125c in the system controller 122 for evaluation of input (e.g., C,M,Y,K) data as needed. The membrane construction at 336 can be formulated as a data fitting operation given a set of observations $\{y_i; i=1; 2; \ldots\}$, a function f(x) is constructed to best fit the observation $(y_i)$ subject to the constraint that f is sufficiently smooth. Preferably, the fitting error $\|y-f(x)\|^2$ is minimized while keeping the smooth constraint satisfied. For this problem, various techniques have been proposed, such as filtering, spline fitting, or regularization.

At 340, the characterization system 124 updates the forward color transform 125 as a summation of the parametric surface forward color transform 125a with the nonparametric residual forward color transform 125b and the membrane forward color transform 125c:

$L(CMYK)=f_{L,adapt\ surf}(CMYK)+f_{L,residual}(CMYK)+f_{L,membrane}(CMYK)$, $a^*(CMYK)=f_{a^*,adapt\ surf}(CMYK)+f_{a^*,residual}(CMYK)+f_{a^*,membrane}(CMYK)$, and $b^*(CMYK)=f_{b^*,adapt\ surf}(CMYK)+f_{b^*,residual}(CMYK)+f_{b^*,membrane}(CMYK)$.

The adaptation by the system 124 thus updates the smooth surface reflected in the parametric surface transform 125a and also provides localized adjustment of the nonparametric residual transform 125b. In this regard, the inventors have appreciated that the adaptation set is estimated as a deviation from the measured La*b* values, and that deviation (the prediction error data set 124d) is systematic. Consequently, for color patches 162 having similar C,M,Y,K values, the prediction error tends to be similar, and thus localized drift is expected. Moreover, the inventors have found that the prediction error for the test set are typically very close to that of the adaptation set, and that the adaptation set and its prediction error can be utilized to advantageously improve the accuracy of the forward color transform 125. Without wishing to be tied to any particular theory, it is believed that while the physical properties of printers and other color reproduction devices drift slowly over time, the parametric surface transform 125a is a convenient smooth surface representation and the true underlying surface need not be polynomial, in which case there may be some drifting that the polynomial surface adaptation cannot model as accurately as desired. To improve the performance of the accuracy of the forward transform 125 in such cases, the local adjustment techniques described above incorporate a membrane parametric representation 125c into the transform 125 that is locally smooth since the prediction error data 124e tends to be structured with spatial continuity over the device independent CMYK color space.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of characterizing a color reproduction device, the method comprising:
providing a forward color transform for the device mapping color from a first color space associated with an internal color representation of the device to a second color space representing measurements of observed color values, the forward color transform including a parametric surface forward color transform and a nonparametric residual forward color transform;
producing a plurality of visible adaptation test images according to an input adaptation data set in the first color space using the device;
measuring the adaptation test images to generate a measured adaptation data set in the second color space; and
using at least one processor, adapting the parametric surface forward color transform using the input adaptation data set and the measured adaptation data set;
using the at least one processor, generating a prediction data set in the second color space using the adapted parametric surface forward color transform and the nonparametric residual forward color transform;
using the at least one processor, generating a prediction error data set in the second color space using the input adaptation data set and the prediction data set;
using the at least one processor, generating a membrane forward color transform using the prediction error data set; and
using the at least one processor, updating the forward color transform using the adapted parametric and nonparametric forward color transforms.

2. The method of claim 1, wherein updating the forward color transform comprises updating the forward color transform using the parametric surface and membrane forward color transforms and the nonparametric forward color transform.

3. The method of claim 1, wherein generating the device independent prediction data set comprises:
evaluating the parametric surface forward color transform for each point in the input adaptation data set;
evaluating the nonparametric residual forward color transform for each point in the input adaptation data set; and
summing the parametric and nonparametric transform evaluations for each point in the input adaptation data set to generate the prediction data set.

4. The method of claim 3, wherein generating the prediction error data set comprises for each point in the input adaptation data set, subtracting the values of the prediction data set from the values of the measured adaptation data set.

5. The method of claim 4, wherein generating the membrane forward color transform comprises fitting a continuous and smooth membrane surface to the prediction error data set.

6. The method of claim 5, wherein updating the forward color transform comprises summing the parametric surface forward color transform with the nonparametric residual forward color transform and the membrane forward color transform.

7. The method of claim 5, wherein the input adaptation data set is a C,M,Y,K data set, and wherein the measured adaptation data set is an L,a*,b* data set.

8. The method of claim 1, wherein generating the prediction error data set comprises for each point in the input adaptation data set, subtracting the values of the prediction data set from the values of the measured adaptation data set.

9. The method of claim 1, wherein generating the membrane forward color transform comprises fitting a smooth membrane surface to the prediction error data set.

10. The method of claim 1, wherein updating the forward color transform comprises summing the parametric surface forward color transform with the nonparametric residual forward color transform and the membrane forward color transform.

11. The method of claim 1, wherein the input adaptation data set is a C,M,Y,K data set, and wherein the measured data set is an L,a*,b* data set.

12. A color processing device, comprising:
a rendering system operative to produce a visible image according to input color data in a first color space;
a system controller operative to provide the input color data to the rendering system according to a print job;
a sensor operative to generate measured data in a second color space representative of the visible image; and
a characterization system coupled with the system controller and the sensor, the characterization system comprising a forward color transform for the device mapping color from a first color space associated with an internal color representation of the device to a second color space representing measurements of observed color values, the forward color transform including a parametric surface forward color transform and a nonparametric residual forward color transform, the characterization system being operative to adapt the parametric surface forward color transform using an input adaptation data set of the first color space and a measured adaptation data set of the second color space, to generate a prediction data set in the second color space using the adapted parametric surface forward color transform and the nonparametric residual forward color transform, to generate a prediction error data set in the second color space using the input adaptation data set and the prediction data set, to generate a membrane forward color transform using the prediction error data set, and to update the forward color transform using the adapted parametric and nonparametric forward color transforms.

13. The color processing system of claim 12, wherein the characterization system is operative to evaluate the parametric surface forward color transform for each point in the input adaptation data set, to evaluate the nonparametric residual forward color transform for each point in the input adaptation data set, and to sum the parametric and nonparametric transform evaluations for each point in the input adaptation data set in order to generate the prediction data set.

14. The color processing system of claim 12, wherein the characterization system is operative for each point in the input adaptation data set to subtract the values of the prediction data set from the values of the measured adaptation data set in order to generate the prediction error data set.

15. The color processing system of claim 12, wherein the characterization system is operative to fit a smooth membrane surface to the prediction error data set in order to generate the membrane forward color transform.

16. The color processing device of claim 12, wherein the rendering system comprises a plurality of marking devices operative according to the device dependent color data to transfer marking material onto a corresponding medium to create visible test images on the medium.

\* \* \* \* \*